United States Patent
Magri et al.

(10) Patent No.: US 9,973,064 B2
(45) Date of Patent: May 15, 2018

(54) METHOD AND STATION FOR THE CONSTRUCTION OF A STATOR WINDING WITH RIGID BARS FOR A ROTARY ELECTRICAL MACHINE

(71) Applicant: MAGNETI MARELLI S.p.A., Corbetta (IT)

(72) Inventors: Marco Magri, Bologna (IT); Franco Ciampolini, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 292 days.

(21) Appl. No.: 14/940,294

(22) Filed: Nov. 13, 2015

(65) Prior Publication Data

US 2016/0141943 A1    May 19, 2016

(30) Foreign Application Priority Data

Nov. 14, 2014   (IT) .............................. BO2014A0643

(51) Int. Cl.
  *H02K 15/04*     (2006.01)
  *H02K 15/085*    (2006.01)
  *H02K 11/20*     (2016.01)

(52) U.S. Cl.
  CPC ..... *H02K 15/0414* (2013.01); *H02K 15/0421* (2013.01); *H02K 15/085* (2013.01);
  (Continued)

(58) Field of Classification Search
  CPC ......... Y10T 29/49004; Y10T 29/49764; Y10T 29/53022; Y10T 29/53039;
  (Continued)

(56) References Cited

U.S. PATENT DOCUMENTS 7,480,987 B1    1/2009  Guercioni
7,659,728 B1 *  2/2010  Watkins, Jr. ......... G01R 31/343
                                                  324/546
(Continued)

FOREIGN PATENT DOCUMENTS

EP    2287625 A1    2/2011
EP    2437378 A1    4/2012

OTHER PUBLICATIONS

Search Report dated Aug. 25, 2015 issued in Italian Application No. BO2014A000643.

*Primary Examiner* — Peter DungBa Vo
*Assistant Examiner* — Joshua D Anderson
(74) *Attorney, Agent, or Firm* — Howard & Howard Attorneys PLLC

(57) ABSTRACT

Method and station for the construction of a stator winding with rigid bars for a rotary electrical machine; an insulated wire of electrically conductor material and provided on the outside with an insulating layer is unwound from a coil. A final end of the insulated wire is bent in a "U" shape so as to create a bar having two legs connected to one another by a cusp. The insulated wire is transversely cut to separate the rigid bar from the remaining part of the wire; and the bar is inserted into a stator slot of a magnetic core of a stator. The electrical conductivity is measured between the core and the outer surface of the insulated wire by means of a first electrode electrically and permanently connected to the core of the insulated wire and a second electrode, which rubs against the outer surface of the insulated wire.

9 Claims, 7 Drawing Sheets

(52) U.S. Cl.
CPC ......... *H02K 11/20* (2016.01); *Y10T 29/49004* (2015.01); *Y10T 29/49073* (2015.01); *Y10T 29/53022* (2015.01); *Y10T 29/53161* (2015.01)

(58) Field of Classification Search
CPC ......... Y10T 29/53043; Y10T 29/59009; Y10T 29/59073; Y10T 29/5141; Y10T 29/53143; Y10T 29/53157; Y10T 29/53161; Y10T 29/49798; Y10T 29/49829; Y10T 29/49885; Y10T 29/5116; Y10T 29/5122; Y10T 29/5136; Y10T 29/5142; Y10T 29/5121; Y10T 29/5187; H02K 3/32; H02K 3/325; H02K 3/34; H02K 3/345; H02K 3/46; H02K 3/48; H02K 11/20; H02K 15/024; H02K 15/04; H02K 15/0414; H02K 15/0421; H02K 15/06; H02K 15/062; H02K 15/063; H02K 15/064; H02K 15/08; H02K 15/085; H02K 15/10; H02K 15/105; G01R 31/021; G01R 31/022; G01R 31/024; G01R 31/025; G01R 31/34; G01R 31/343; G01R 31/346

See application file for complete search history.

(56) References Cited

U.S. PATENT DOCUMENTS

| | | | |
|---|---|---|---|
| 8,823,237 B2* | 9/2014 | Cominetti | H02K 3/12 29/596 |
| 2011/0037666 A1* | 2/2011 | Behrmann | G01R 31/34 343/703 |
| 2015/0074985 A1* | 3/2015 | Ohno | H02K 15/064 29/596 |

* cited by examiner

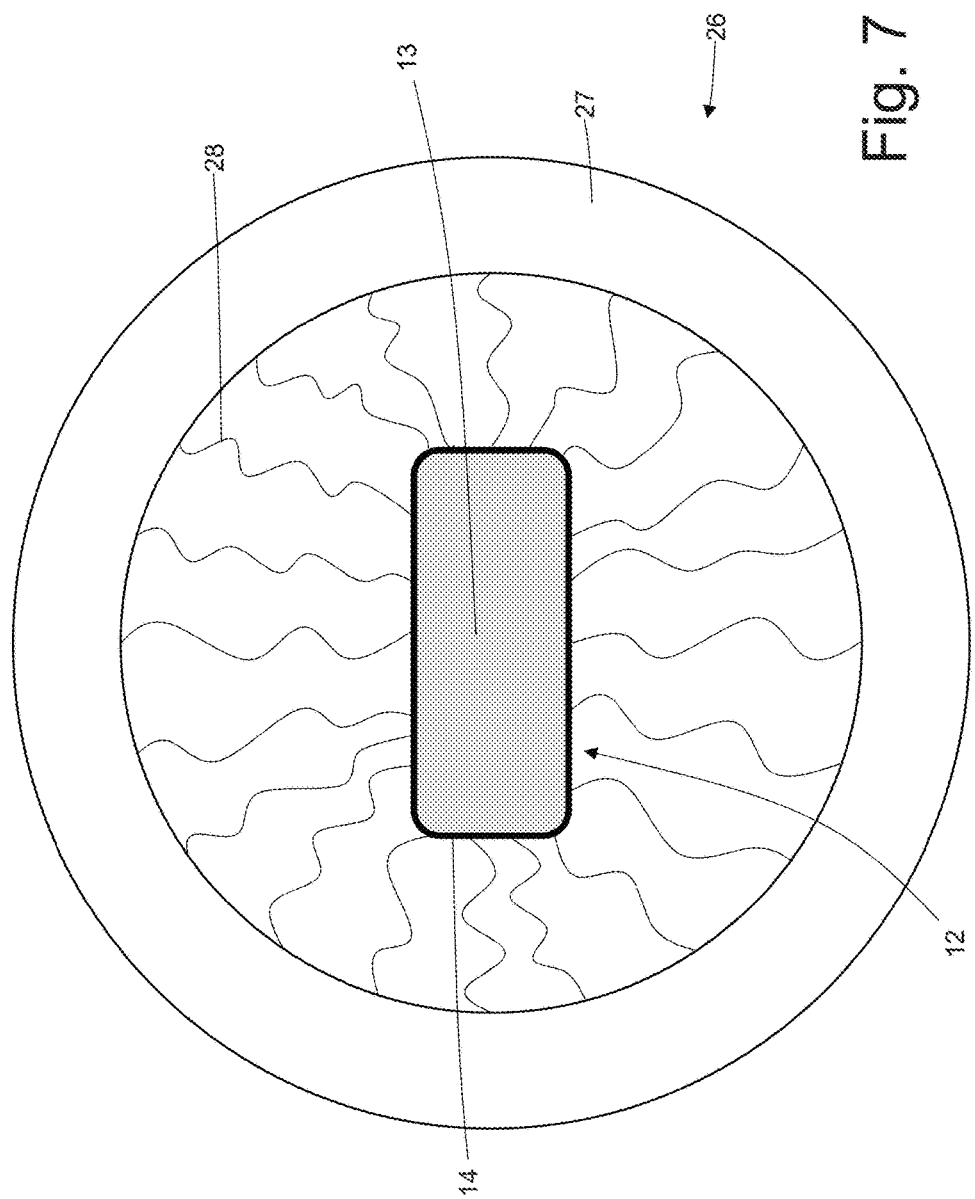

METHOD AND STATION FOR THE CONSTRUCTION OF A STATOR WINDING WITH RIGID BARS FOR A ROTARY ELECTRICAL MACHINE

CROSS-REFERENCE TO RELATED APPLICATIONS

The present application claims priority to and all the benefits of Italian Patent Application No. BO2014A000643, filed on Nov. 14, 2014, which is hereby expressly incorporated herein by reference in its entirety.

BACKGROUND OF THE INVENTION

1. Field of the Invention

The present invention relates to a method for the construction of a stator winding with rigid bars for a rotary electrical machine as well as a station used in carrying out the method.

2. Description of the Related Art

Traditionally, the stator winding of an electrical machine is obtained by means of filiform and flexible conductors having a circular cross section which are initially coil-wound. Subsequently, the coils are inserted into stator slots and are hence electrically connected to one another. The construction method known in the related art is complex to automate, as it is very difficult to automatically insert the coils inside of the stator slots not having stable shaped coils and having to be deformed to pass through the small axial opening of the slots.

To overcome the construction difficulties of the stator winding obtained by means of filiform and flexible conductors having a circular cross section, a stator winding obtained by means of rigid bars of rectangular section has been proposed. In a stator winding obtained by means of rigid bars, a number of rigid bars are used which are initially U-shaped, and then are axially inserted into the stator slots forming one entry side, in which the cusps of the U-shaped bars are arranged, and an exit side, in which the legs (that is, the straight portions) of the U-shaped bars are arranged. Once all the bars are inserted into the stator slots the legs on the exit side are twisted (by means of an operation called "twisting"), and then the free ends of the legs are connected to one another by welding to form electrical paths of the stator winding. A stator winding obtained by means of rigid bars is for example described in patent application EP2437378A1.

The process for forming the rigid bars entails unwinding, from a coil, a copper (or other conductor metal) wire having a rectangular section that has been previously electrically insulated by applying an insulating layer (typically by a coating process), subjecting the wire to a mechanic straightening process to eliminate the residual curvature resulting from having been wound into a coil, transversely cutting the wire to separate the wire from a rigid straight bar, and finally bending in a "U" shape the rigid bar to give the rigid bar the desired shape. A process for forming the rigid bars is for example described in U.S. Pat. No. 7,480,987B1.

It has been observed that to ensure a proper electrical insulation of the bars (that is, to avoid the occurrence of short-circuits between the bars during operation of the electrical machine) a significantly thicker insulating layer must be applied to the copper wire because it is necessary to electrically insulate the maximum voltage difference that in use is found inside the stator winding. In other words, to ensure a proper electrical insulation of the bars (that is, to avoid the occurrence of short-circuits between the bars during operation of the electrical machine) it is necessary to significantly oversize the thickness of the insulating layer with respect to the maximum voltage difference which in use is found inside the stator winding. The thickness oversizing of the insulating layer is particularly negative, because it on one hand increases the production costs of the bars and on the other decreases the filling coefficient of the slots (i.e. the ratio between the useful conductor section present inside a coil and the overall section of the slot) decreasing (at equal other characteristics) both the power efficiency of the electrical machine, and the rated performance of the electrical machine.

In addition, it has been observed that when the bending in a "U" shape of the rigid bar is performed detachments of parts of the insulating layer at the parts that are more deformed by the bending occur with a relatively high frequency. Of course, when a part (however small) of the insulating layer is detached it is necessary to discard the corresponding bar with an evident increase of the production costs of the electrical machine.

SUMMARY OF THE INVENTION

The object of the present invention is to provide a method and a station for the construction of a stator winding with rigid bars for a rotary electrical machine, which method and station are free from the drawbacks described above and, in particular, are inexpensive and easy to manufacture.

Accordingly, the method for the construction of a stator winding with rigid bars for a rotary electrical machine comprises the steps of unwinding, from a coil, an insulated wire comprising an electrically conductor core and an insulating layer arranged on the outside and surrounding the core; bending, in sequence, the final end of the insulated wire in a "U" shape, so as to create a plurality of bars, each having two legs connected to one another by a cusp; transversely cutting the insulated wire in sequence, so as to separate the rigid bars from the remaining part of the wire; inserting the rigid bars into corresponding stator slots of a magnetic core of a stator; and measuring the electrical conductivity between the core and the outer surface of the insulated wire by means of a first electrode, which is electrically and permanently connected to the core of the insulated wire, and by means of a second electrode, which rubs against the outer surface of the insulated wire.

In addition, the present invention is also directed toward the station for the construction of a stator winding with rigid bars for a rotary electrical machine. The construction station includes an unwinding device, which unwinds, from a coil, an insulated wire comprising an electrically conductor core and an insulating layer arranged on the outside and surrounding the core. A bending device bends, in sequence, the final end of the insulated wire in a "U" shape, so as to create a plurality of bars, each having two legs connected to one another by a cusp. A cutting device transversely cuts the insulated wire in sequence, so as to separate the rigid bars from the remaining part of the wire. An inserting device inserts the rigid bars into corresponding stator slots of a magnetic core of a stator. A measuring device measures the electrical conductivity between the core and the outer surface of the insulated wire by means of a first electrode, which is electrically and permanently connected to the core of the insulated wire, and by means of a second electrode, which rubs against the outer surface of the insulated wire.

Other objects, features and advantages of the present invention will be readily appreciated as the same becomes better understood after reading the subsequent description taken in connection with the accompanying drawings.

BRIEF DESCRIPTION OF THE DRAWINGS

FIG. 7 is a schematic view of an electrode of a measuring device of the construction station of FIG. 4.

DETAILED DESCRIPTION OF THE INVENTION

Figure 1:
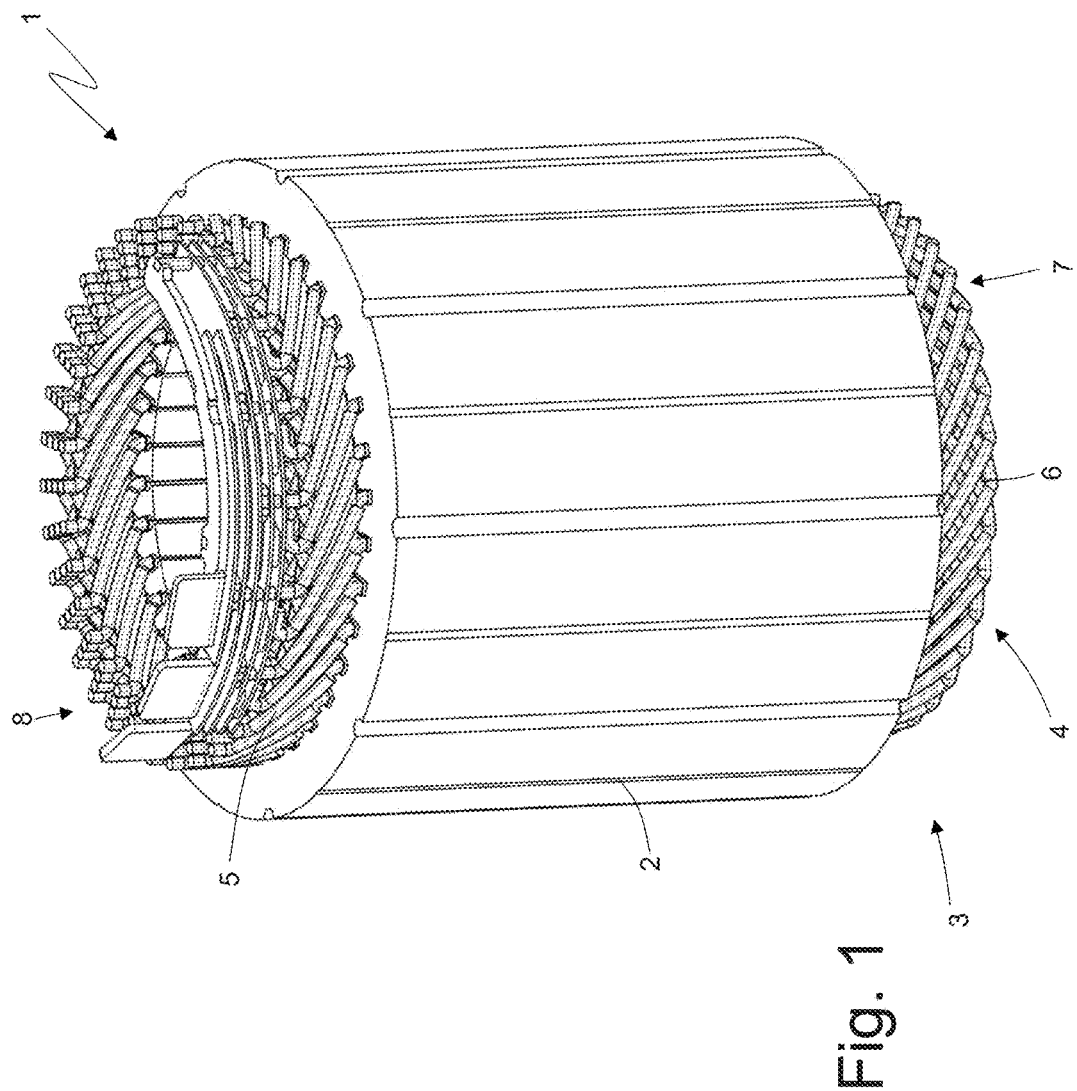
FIG. 1 is a schematic perspective view, with parts removed for clarity, of a stator of an electrical machine provided with a stator winding obtained according to the method of construction of the present invention.

In FIG. 1, reference number 1 indicates as a whole a stator of a synchronous electrical machine for auto-traction of reversible type (that is, which may operate both as an electric motor by absorbing electrical power and generating a mechanical driving torque, and as an electric generator absorbing mechanical energy and generating electrical power). The stator 1 has a cylindrical tubular shape and is arranged about a rotor (not illustrated) to enclose the rotor therein.

The stator 1 comprises a magnetic core 2 which consists of a series of sandwiched sheets and has a tubular shape with a central hole. The magnetic core 2 is longitudinally crossed by thirty-six stator slots which are uniformly distributed along the inner side of the magnetic core 2, and house a three-phase stator winding 3 (obviously the number of stator slots may be different). The three-phase stator winding 3 comprises a series of rigid U-shaped bars 4, each of which comprises two legs 5 connected to one another by a cusp 6 (as better illustrated in FIG. 2). The two legs 5 of a same bar 4 constitute two corresponding conductors of the stator winding 3. It is worth noting that each U-shaped bar 4 has a "three-dimensional" bending, that is, which provides a bending onto two planes perpendicular one to the other. The U-shaped bars 4 are inserted through the stator slots defining an entry side 7, in which the cusps 6 of the U-shaped bars 4 are arranged, and an exit side 8, in which the legs 5 of the U-shaped bars 4 are arranged. In particular, in each slot four legs 5 (that is, four conductors of the stator winding 3) are arranged, belonging to four corresponding rigid U-shaped bars 4 different one from the other. The ends of the legs 5 of the U-shaped bars 4 are electrically connected to each other to form the electrical paths of the stator winding 3.

Figure 2:
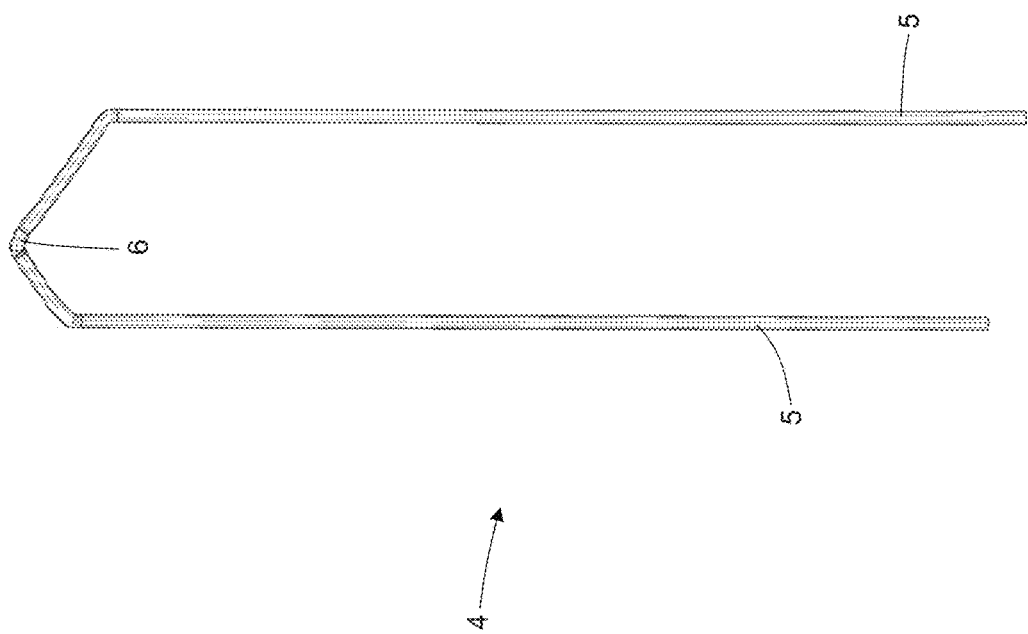
FIG. 2 is a perspective and schematic view of a rigid bar bent in a "U" shape forming part of the stator winding of the stator of FIG. 1.
Figure 3:
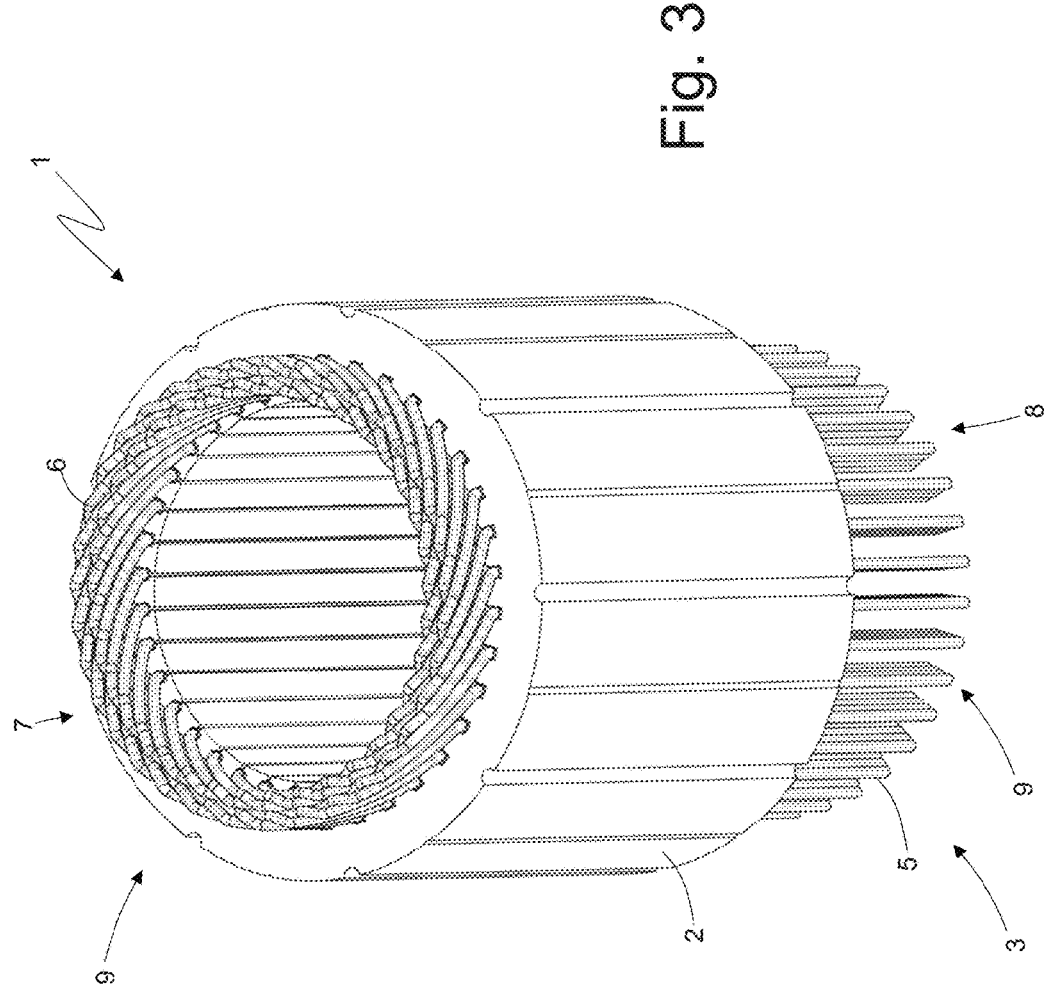
FIG. 3 is a perspective, schematic view and with parts removed for clarity, of an initial construction step of the stator winding of the stator of FIG. 1.

Initially, the rigid bars 4 are centrally bent 180° to be U-shaped and assume the shape shown in FIG. 2. Once the U-shaped bars 4 are ready, the U-shaped bars 4 themselves are inserted into the corresponding stator slots. The operation can be individually performed (that is, each U-shaped bar 4 is inserted alone into the corresponding two stator slots), in groups (that is, groups of U-shaped bars 4 are inserted into the corresponding stator slots), or in one step (that is, all the U-shaped bars 4 are inserted together in the corresponding stator slots with a single insertion movement). When entering all the U-shaped bars 4 into the stator slots is finished, the stator winding 3 is as illustrated in FIG. 3. At this point, the legs 5 of the U-shaped bars 4 protruding on the exit side 8 of the magnetic core 2 are twisted by means of respective double bends to assume a "Z" shape. Once the twisting of the legs 5 of the U-shaped bars 4 is completed, the ends of the legs 5 of the U-shaped bars 4 are electrically connected one to the other (typically by laser performed welding) to form electrical paths of the stator winding 3 also with the aid of suitable connecting bridges consisting of flat plates transversely arranged (i.e. perpendicularly to the central axis of rotation). Further details on the implementation of the stator winding 3 are shown in patent application EP2437378A1, all of which are incorporated herein by reference.

Figure 4:
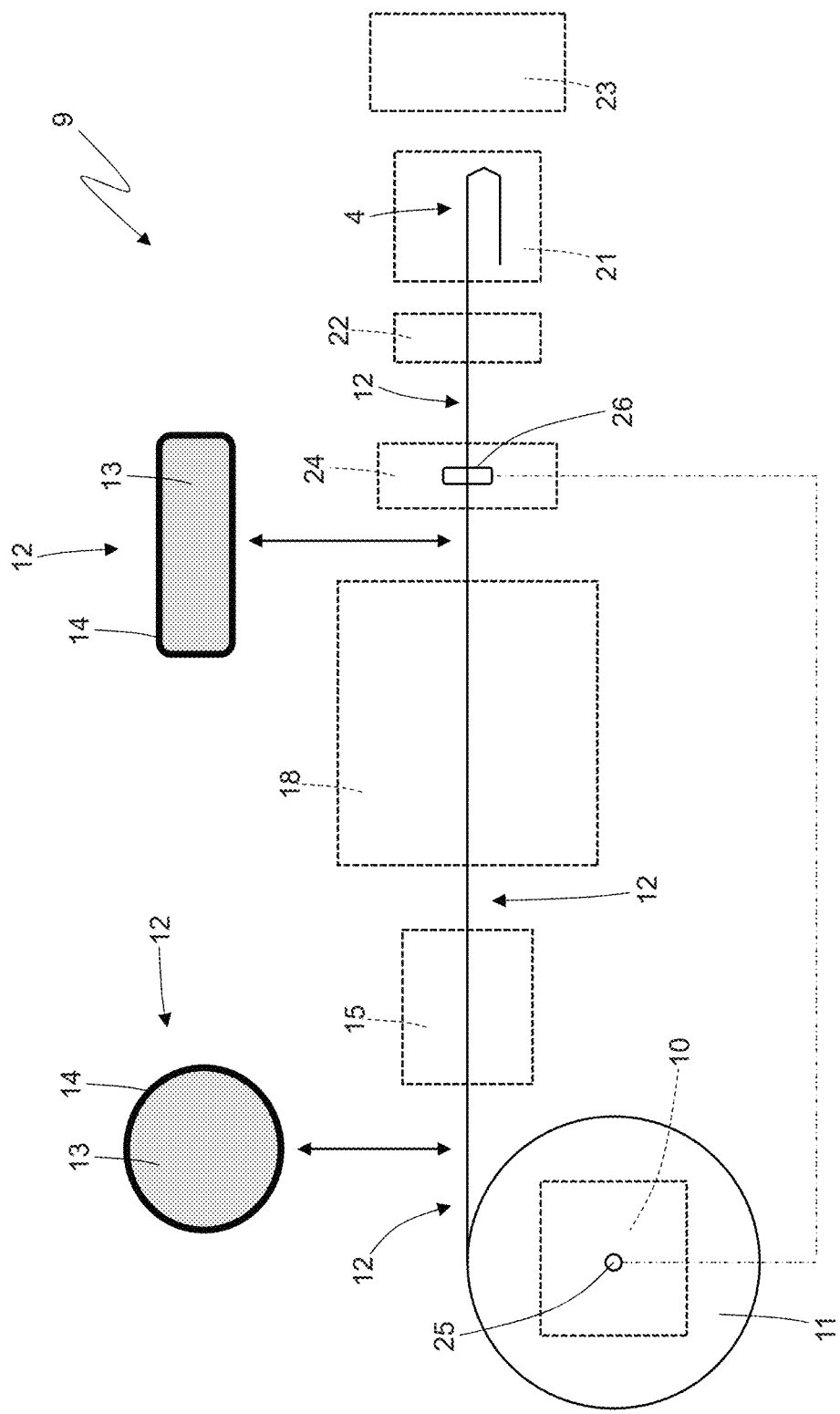
FIG. 4 is a schematic view of a construction station of a stator winding with rigid bars which is obtained according to the present invention.

In FIG. 4, reference number 1 indicates as a whole a construction station of the winding stator 3 with rigid bars 4 illustrated in FIG. 1.

The construction station 9 comprises an unwinding device 10 for unwinding an insulated wire 12 of electrically conductor material from a coil 11. The insulated wire 12 comprises an electrically conductor core 13 (i.e. of metallic material, typically copper) and an insulating layer 14 surrounding the core 13 and is typically applied by a coating process.

Figure 5:
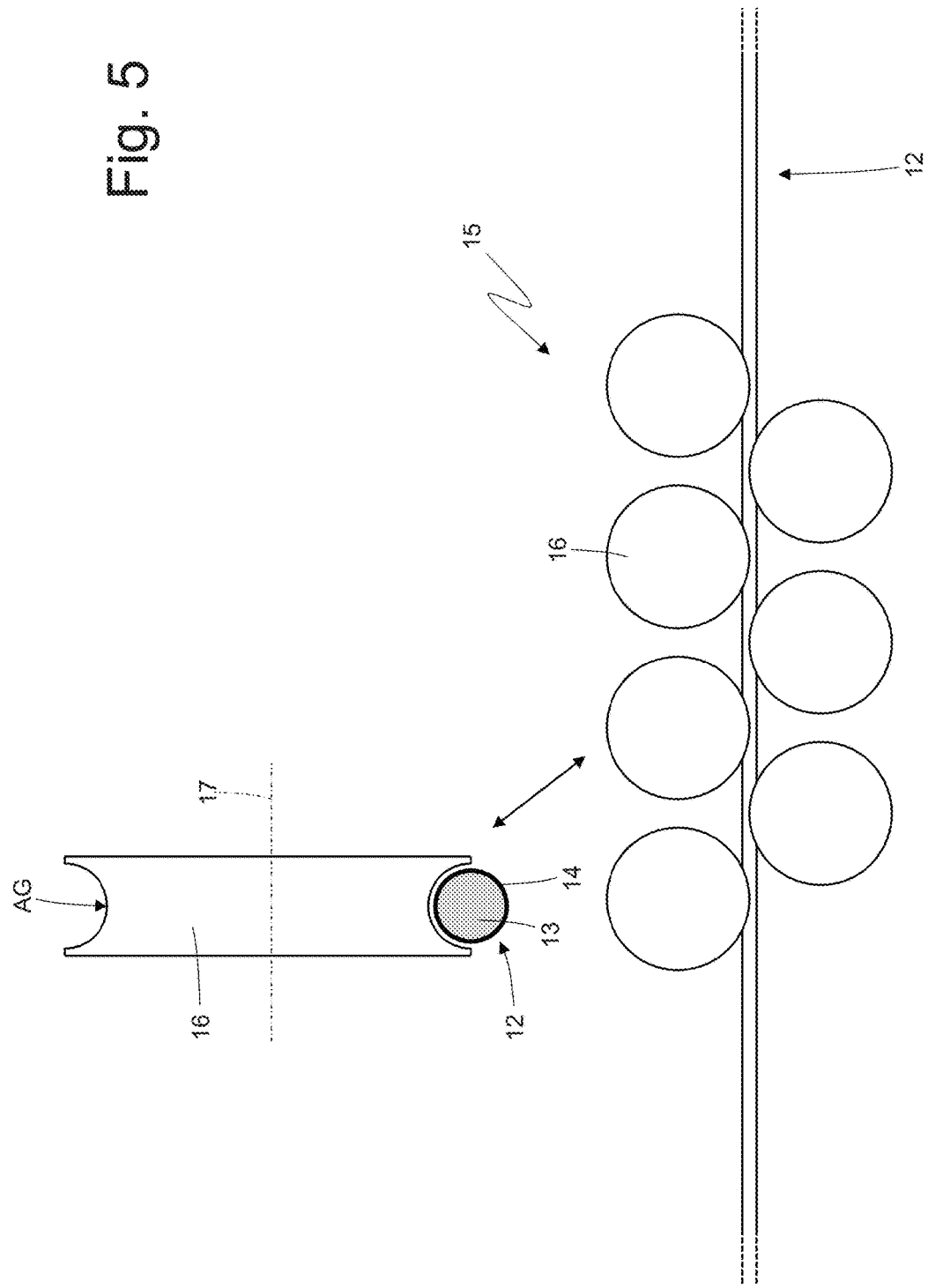
FIG. 5 is a schematic view of a straightening device of the construction station of FIG. 4.

Furthermore, the construction station 9 comprises a straightening device 15, which subjects the insulated wire 12 to a straightening process to eliminate the residual curvature resulting from having been coil-wound. The straightening device 15 is arranged immediately downstream from the unwinding device 10 so that, as soon as it is unwound from the coil 11, the insulated wire 12 is, as first processing, subjected to the straightening process. As illustrated in FIG. 5, the straightening device 15 comprises a cascade of straightening rollers 16 opposite to one another which are idly mounted to freely rotate about respective axes 17 of rotation and defining one with the other a rectilinear path that the insulated wire 12 is "forced" to follow. According to one embodiment illustrated in FIG. 5, each straightening roller 16 has an annular groove AG which reproduces in negative the shape of the insulated wire 12 and houses the insulated wire 12 therein to better guide the feeding of the insulated wire 12. In the embodiment illustrated in FIG. 5, the straightening device 15 comprises only one cascade of straightening rollers 16 opposite one to the other having the axes 17 of rotation arranged horizontally. According to a different and perfectly equivalent embodiment, the straightening device 15 comprises a first cascade of straightening rollers 16 opposite one to the other having the axes 17 of rotation arranged horizontally (as illustrated in FIG. 5) and a second cascade of straightening rollers 16 opposite one to the other having the axes 17 of rotation arranged vertically (i.e. perpendicularly to the first cascade of straightening rollers 16 opposite one to the other).

As illustrated in FIG. 4, the construction station 9 comprises a roll device 18 which subjects the insulated wire 12, initially having a circular cross section, to a cold-roll process to give the wire 12 a rectangular cross section. In other words, the insulated wire 12 wound into a coil 11 has a circular cross-section (as illustrated on the left in FIG. 4)

which is converted into a rectangular cross section (as illustrated on the right in FIG. 4) by the cold-roll process imparted by the roll device 18. It is important to note that the insulated wire 12 is subjected to the cold-roll process when already provided with the insulating layer 14; therefore the cold-roll process to which the insulated wire 12 is subjected deforms at the same time both the metallic core 13 of the insulated wire 12, and the insulating layer 14 of the insulated wire 12 surrounding the core 13.

Figure 6:
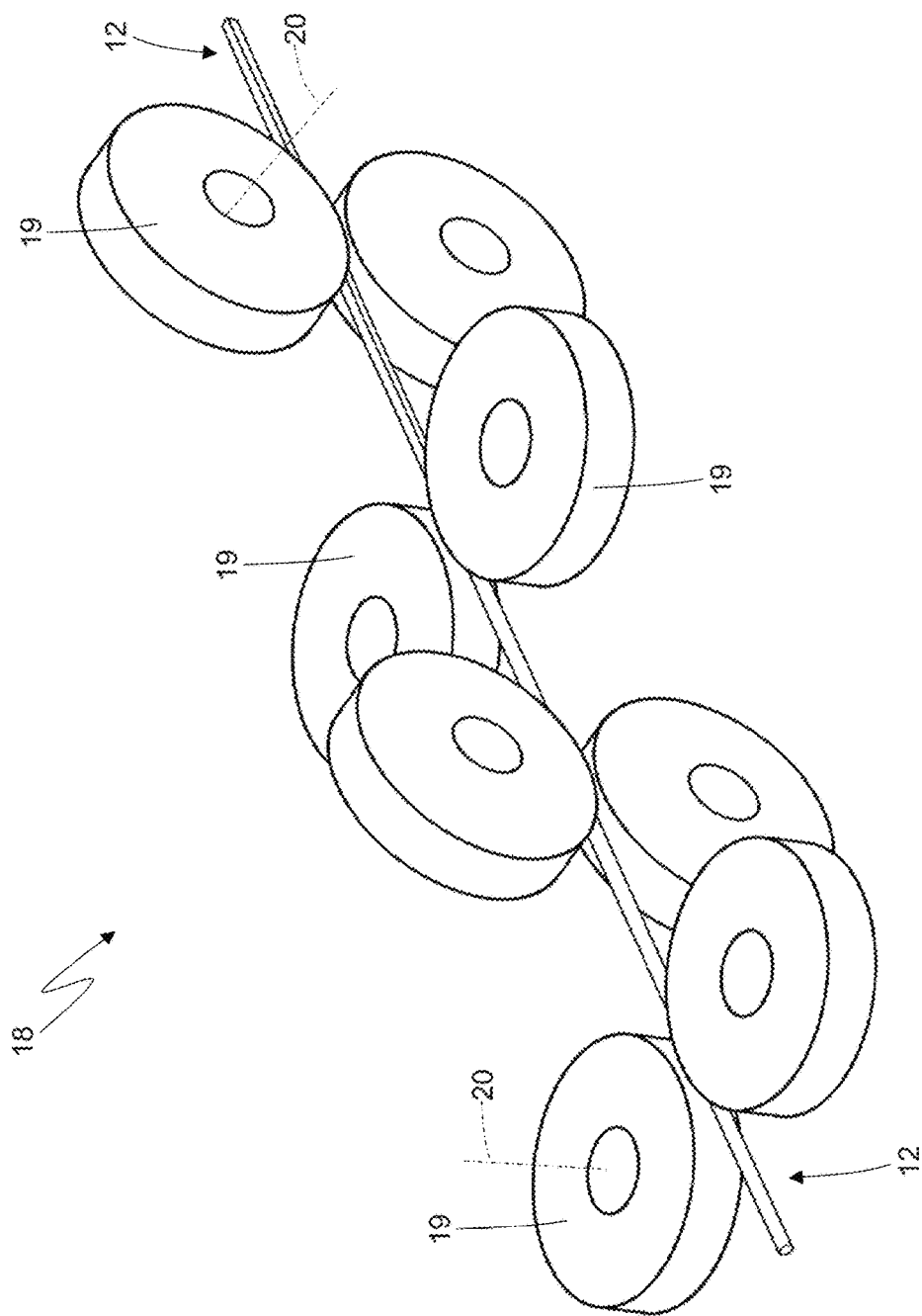
FIG. 6 is a schematic view of a roll device of the construction station of FIG. 4.

As illustrated in FIG. 6, the roll device 18 comprises four pairs of rolling cylinders 19 opposite one to the other which rotate about respective axes 20 of rotation. Preferably, the four pairs of rolling cylinders 19 are motorized (i.e. are brought into rotation by respective electric motors or by a single electric motor common to all the pairs of rolling cylinders 19). In the embodiment illustrated in FIG. 6, the roll device 18 comprises four pairs of rolling cylinders 19 opposite one to the other: a first pair of rolling cylinders 19 opposite one to the other is oriented horizontally, a second pair of rolling cylinders 19 opposite one to the other is oriented vertically (i.e. perpendicular to the first pair of rolling cylinders 19 opposite one to the other), a third pair of rolling cylinders 19 opposite one to the other is oriented horizontally (as the first pair of rolling cylinders 19 opposite one to the other), and a fourth pair of rolling cylinders 19 opposite one to the other is oriented vertically (as the second pair of rolling cylinders 19 opposite one to the other and perpendicularly to the third pair of rolling cylinders 19 opposite one to the other). According to an alternative embodiment perfectly equivalent and not illustrated, the roll device 18 comprises a different number of pairs of rolling cylinders 19 opposite one to the other: for example, two, three, five or six pairs of rolling cylinders 19 opposite one to the other.

As clearly illustrated in FIG. 4, the insulated wire 12 is subjected to the straightening process in the straightening device 15 immediately before being subjected to the cold-roll process in the roll device 18.

As illustrated in FIG. 4, the construction station 9 comprises a bending device 21 (known and not illustrated in detail) that bends in a "U" shape a final end of the insulated wire 12 so as to obtain a bar 4 having two legs 5 connected to one another by a cusp 6 (as better illustrated in FIG. 2) and a cutting device 22 (known and not illustrated in detail) which transversely cuts the insulated wire 12 to separate the rigid bar 4 from the remaining part of the wire 12. It is important to underscore that the bending in a "U" shape of the final end of the insulated wire 12 to obtain the bar 4 can be indifferently performed before or after the transverse cutting of the insulated wire 12 to separate the rigid bar 4 from the remaining part of the insulated wire 12. In other words, it is possible to transversely cut the wire 12 to separate the bar 4, still straight, and then bend in a "U" shape the bar 4 only after the cut, or it is possible to transversely cut the wire 12 after the "U" shape bending to separate the bar 4 already bent in a "U" shape.

As illustrated in FIG. 4, the construction station 9 comprises an inserting device 23 (known and not illustrated in detail), which withdraws one by one the bars 4 bent in a "U" shape from the bending device 21 and inserts (individually, in groups or all together) the bars 4 bent in a "U" shape in the corresponding stator slots of the core 2 of the stator 1 (as previously described and as illustrated in FIG. 3). The construction station 9 comprises additional operating devices (known and not illustrated) that perform the other operations described above to complete the construction of the stator winding 3.

As illustrated in FIG. 4, the insulated wire 12 is subjected to the cold-roll process in the roll device 18 before being bent and/or transversely cut in the bending device 21 and in the cutting device 22, respectively.

According to one embodiment illustrated in FIG. 4, the construction station 9 comprises a measuring device 24 measuring in-line the electrical conductivity between the core 13 and the outer surface of the insulated wire 12 by an electrode 25 electrically and permanently connected to the core 13 of the insulated wire 12 (at the unwinding device 10) and an electrode 26, which rubs against the outer surface of the insulated wire 12 (as better illustrated in FIG. 7), i.e. rubs against the insulating layer 14 of the insulated wire 12. In other words, the measuring device 24 detects the continuity of the insulating layer 14 of the insulated wire 12 to verify that the insulating layer 14 is intact. The detection is performed by measuring the electrical conductivity between the core 13 and the outer surface of the insulated wire 12, i.e. by verifying if there is a sufficient electrical insulation between the core 13 and the outer surface of the insulated wire 12.

The electrode 25 normally comprises a conductor clamp (of known type) which is fixed to a leading end of the insulated wire 12 which is integral with the coil 11 and is "stripped" (i.e. cleaned of the insulating layer 14) so as to uncover the underlying conductor core 13. The electrode 26 is arranged in a fixed position along the feeding path of the insulated wire 12 so that the feeding of the insulated wire 12 causes the electrode 26 to rub against the outer surface of the insulated wire 12 (i.e. against the insulating layer 14). As illustrated in FIG. 7, the electrode 26 comprises an annular brush 27 inside which the insulated wire 12 slides and provided with a plurality of flexible and electrically conductor bristles 28 facing inwards. The bristles 28 are made of a "tender" flexible conductor material so as to not damage the insulating layer 14 following the sliding action. For example, the bristles 28 may be flexible, made of brass or carbon or the like.

When the measuring device 24 finds that a part of the insulated wire 12 does not have the necessary degree of insulation, then a discharge process is activated which leads to discarding a portion of the insulated wire from the productive process 12 at whose center the part not having the required degree of insulation can be found. In other words a portion of the insulated wire 12 is discarded at whose center a part having an electrical conductivity greater than a predetermined threshold value can be found (i.e. without the necessary degree of insulation).

According to the embodiment illustrated in FIG. 4, the measuring device 24 is arranged downstream from the roll device 18 for measuring the electrical conductivity after having subjected the insulated wire 12 to the cold-roll process. The function of the measuring device 24 is both to identify any defects in the insulating layer 14 present from the beginning, and to identify any defects in the insulating layer 14 caused by the straightening process operated by the straightening device 15 and/or by the cold-roll process operated by the roll device 18.

In the embodiment illustrated in the attached figures, the cold-roll process gives the insulated wire 12 a rectangular cross section (a possible square cross section is a particular case of the rectangular cross section); according to a different embodiment, the cold-roll process gives the insulated wire 12 a polygonal cross-section different from the rectangular section, for example a trapezoidal cross-section.

The method of construction described above has numerous advantages. In the first place, it was observed that starting from an insulated wire 12 having a circular cross section which is cold-rolled to obtain an insulated wire 12 having a rectangular section it is possible to obtain an insulated wire 12 having a rectangular section which has a very uniform insulating layer 14 (that is, having constant thickness over the entire surface and particularly at the edges) and very well adherent to the underlying core 13 (i.e. little inclined to detaching even when subjected to bending). Therefore, starting from an insulated wire 12 having a circular cross section which is cold-rolled to obtain an insulated wire 12 having a rectangular section it is possible to use a particularly small thickness of the insulating layer 14 (i.e. minimum thickness to withstand the maximum voltage difference that in use is found inside the stator winding 3), that is, it is not necessary to use any oversizing of the thickness of the insulating layer 14 to compensate for unevenness and irregularity of the insulating layer 14. In addition, by reducing the frequency of detachment of the insulating layer 14 it is possible to significantly reduce the number of rigid bars 4 discarded thereby reducing the production cost of the stator winding 3.

In addition, on the market insulated wires 12 having a circular cross-section of any measure are readily available from many different suppliers. However, on the market insulated wires 12 having a rectangular cross-section are much more difficult to obtain. Therefore, the fact of using insulated wires 12 having a circular cross section instead of insulated wire 12 having a rectangular cross section makes it much simpler (and therefore inexpensive, being able to choose from many different suppliers) the purchase of the coils 11 of insulated wire 12.

The measuring device 24 of the present invention makes it possible to verify in a simple, fast and reliable way the quality of the insulating layer 14. Then it is possible to increase the reliability of the stator winding 3, as the possibility that over time in the stator winding 3 short-circuits between the rigid bars 4 during operation of the electrical machine occur is significantly reduced.

Finally, the method of construction described above has numerous advantages, is simple and inexpensive to produce, since the roll device 18 is inexpensive and very reliable, having a low cost and being particularly compact.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for the construction of a stator winding with rigid bars for a rotary electrical machine; the method of construction comprises the steps of:
   unwinding, from a coil, an insulated wire comprising an electrically conductor core and an insulating layer arranged on the outside and surrounding the core;
   bending a final end of the insulated wire in a "U" shape, so as to create a rigid bar having two legs connected to one another by a cusp;
   transversely cutting the insulated wire so as to separate the rigid bar from a remaining part of the insulated wire;
   creating a plurality of rigid bars each having two legs connected to one another by a cusp by sequentially performing the step of unwinding, the step of bending, and the step of transversely cutting;
   inserting the rigid bars into corresponding stator slots of a magnetic core of a stator; and
   measuring an electrical conductivity between the core and an outer surface of the insulating layer by means of a first electrode, which is electrically and permanently connected to the core of the insulated wire, and by means of a second electrode, which rubs against the outer surface of the insulated wire;
   wherein the second electrode is arranged in a fixed position along a feeding path of the insulated wire, so that the feeding of the insulated wire causes the second electrode to rub against the outer surface of the insulated wire.

2. The method of construction as set forth in claim 1, wherein the second electrode comprises an annular brush, inside which the insulated wire slides and which is provided with a plurality of flexible and electrically conductor bristles facing inwards.

3. The method of construction as set forth in claim 1 and comprising the further step of discarding a segment of the insulated wire that has, at the centre, a part having an electrical conductivity that is greater than a predetermined threshold value.

4. The method of construction as set forth in claim 1, wherein the electrical conductivity is measured before bending in a "U" shape the final end of the insulated wire.

5. A station for the construction of a stator winding with rigid bars for a rotary electrical machine; the construction station comprising:
   an unwinding device, which unwinds, from a coil, an insulated wire comprising an electrically conductor core and an insulating layer arranged on the outside and surrounding the core;
   a bending device, which bends a final end of the insulated wire in a "U" shape, so as to create a rigid bar having two legs connected to one another by a cusp;
   a cutting device, which transversely cuts the insulated wire, so as to separate the rigid bar from a remaining part of the insulated wire;
   an inserting device, which inserts a plurality of rigid bars bent by the bending device and separated from the insulated wire by the cutting device into corresponding stator slots of a magnetic core of a stator; and
   a measuring device, which measures an electrical conductivity between the core and an outer surface of the insulating layer by means of a first electrode, which is electrically and permanently connected to the core of the insulated wire, and by means of a second electrode, which rubs against the outer surface of the insulated wire;
   wherein the second electrode is arranged in a fixed position along a feeding path of the insulated wire, so that the feeding of the insulated wire causes the second electrode to rub against the outer surface of the insulated wire.

6. A method for the construction of a stator winding with rigid bars for a rotary electrical machine; the method of construction comprises the steps of:
   unwinding, from a coil, an insulated wire comprising an electrically conductor core and an insulating layer arranged on the outside and surrounding the core;
   bending a final end of the insulated wire in a "U" shape, so as to create a rigid bar having two legs connected to one another by a cusp;
   transversely cutting the insulated wire so as to separate the rigid bar from a remaining part of the insulated wire;

creating a plurality of rigid bars each having two legs connected to one another by a cusp by sequentially performing the step of unwinding, the step of bending, and the step of transversely cutting;

inserting the rigid bars into corresponding stator slots of a magnetic core of a stator; and measuring an electrical conductivity between the core and an outer surface of the insulating layer by means of a first electrode, which is electrically and permanently connected to the core of the insulated wire, and by means of a second electrode, which rubs against the outer surface of the insulated wire;

wherein the second electrode comprises an annular brush, inside which the insulated wire slides and which is provided with a plurality of flexible and electrically conductor bristles facing inwards.

7. The method of construction as set forth in claim 6 and comprising the further step of discarding a segment of the insulated wire that has, at the centre, a part having an electrical conductivity that is greater than a predetermined threshold value.

8. The method of construction as set forth in claim 6, wherein the electrical conductivity is measured before bending in a "U" shape the final end of the insulated wire.

9. A station for the construction of a stator winding with rigid bars for a rotary electrical machine; the construction station comprising:

an unwinding device, which unwinds, from a coil, an insulated wire comprising an electrically conductor core and an insulating layer arranged on the outside and surrounding the core;

a bending device, which bends a final end of the insulated wire in a "U" shape, so as to create a rigid bar having two legs connected to one another by a cusp;

a cutting device, which transversely cuts the insulated wire, so as to separate the rigid bar from a remaining part of the insulated wire;

an inserting device, which inserts a plurality of rigid bars bent by the bending device and separated from the insulated wire by the cutting device into corresponding stator slots of a magnetic core of a stator; and a measuring device, which measures an electrical conductivity between the core and an outer surface of the insulating layer by means of a first electrode, which is electrically and permanently connected to the core of the insulated wire, and by means of a second electrode, which rubs against the outer surface of the insulated wire;

wherein the second electrode comprises an annular brush, inside which the insulated wire slides and which is provided with a plurality of flexible and electrically conductor bristles facing inwards.

* * * * *